United States Patent [19]
Kawai et al.

[11] Patent Number: 5,945,044
[45] Date of Patent: Aug. 31, 1999

[54] WOOD CEMENT BOARD AND A MANUFACTURING METHOD THEREOF

[75] Inventors: Hidenori Kawai, Tokai; Takeshi Nekota, Ichinomiya, both of Japan

[73] Assignee: Nichiha Corporation, Nagoya, Japan

[21] Appl. No.: 08/903,253

[22] Filed: Jul. 25, 1997

Related U.S. Application Data

[63] Continuation of application No. 08/495,884, Jun. 28, 1995, abandoned.

[30] Foreign Application Priority Data

May 29, 1995 [JP] Japan .................................... 7-155375

[51] Int. Cl.$^6$ ...................................................... B27N 3/08
[52] U.S. Cl. ........................ 264/37.29; 264/240; 264/319; 264/328.2
[58] Field of Search ............................. 156/39; 106/731; 264/37, 240, 319, 299, 328.2, 37.29

[56] References Cited

U.S. PATENT DOCUMENTS

| | | | |
|---|---|---|---|
| 4,406,703 | 9/1983 | Guthrie et al. | 106/731 |
| 5,232,779 | 8/1993 | Spehner | 428/379 |

FOREIGN PATENT DOCUMENTS 55-37468  3/1980  Japan .

OTHER PUBLICATIONS

The English translation document of JP55–37468, Mar. 1980.

*Primary Examiner*—Jenna Davis
*Attorney, Agent, or Firm*—Donald S. Dowden; Cooper & Dunham LLP

[57] ABSTRACT

A wood cement board substantially consisting of reinforcing wood material and a cement wherein said reinforcing wood material is treated by a method comprising attaching an aqueous solution of a mineral acid and adding and mixing an alkaline metal silicate in said reinforcing wood material to prevent the inhibition of hardening of cement by sugar contained said reinforcing wood material is provided in the present invention. According to the present invention, a wood cement board having a high strength is constantly manufactured by using reinforcing wood material made from wood having a big amount of sugar as an inhibiter of hardening of cement such that reinforcing wood material regenerated from wood scrap can be used in wood cement board without any problem.

2 Claims, No Drawings

5,945,044

WOOD CEMENT BOARD AND A MANUFACTURING METHOD THEREOF

This is a continuation of application Ser. No. 08/495,884, filed Jun. 28, 1995 now abandoned.

THE FIELD OF THE INVENTION

The present invention relates to wood cement board and a method of manufacturing said wood cement board.

BACKGROUND OF THE INVENTION

A wood cement board has been manufactured by a wet method, a dry method, or a semi-dry method using a reinforcing wood material and a cement as main materials. A wood flake, a wood wool, a wood pulp and the like are used as a reinforcing wood material. Nevertheless, recently wood resources show a shortage trend, and saving wood resources is requested to protect the environment of the earth.

Accordingly, to save wood resources, it is investigated to use a reinforcing wood material regenerated from a wood scrap such as used lumbers produced in dismembering wood buildings; saw-dusts and chip produced in sawing process; thinned needle-leaved trees; scrap of wood cement board and the like which have been reclaimed or burnt.

Nevertheless, as said wood scrap contains many kinds of wood it is feared that woods including a big amount of sugar as inhibiter of hardening of cement are contained in said wood scrap an d it may be very difficult to remove said wood including a big amount of sugar from said wood scrap.

Accordingly, to use practically the reinforcing wood material regenerated from said wood scrap, it may be necessary to promote a smooth hardening of cement even if said wood including a big amount of sugar is contained in said wood scrap.

DESCRIPTION OF THE PRIOR ART

Hitherto, to solve inhibition of hardening of cement by sugers included in the reinforcing wood material, methods wherein a metal salt such as calcium chloride, magnesium chloride, aluminum chloride and the like is impregnated or mixed in the reinforcing wood material (TOKKAI SHO 51-26930, TOKKAI SHO 51-151722, TOKKAI SHO 60-118658, etc.), methods wherein the reinforcing wood material is immersed in a solution of a mixture consisting of a sulfate and/or an acetate and a silicate (TOKKAI SHO 55-20251, TOKKAI SHO 55-113513, TOKKAI SHO 61-5421, etc.) have been provided.

Said methods in the prior art attempt to promote the hardening of cement by a hardening promoter such as said metal salt or said silicate before sugar come out from said reinforcing wood material into the raw material mixture. Nevertheless, when wood containing a big amount of sugar is contained in said reinforcing wood material, sugar will come out into the raw material mixture before hardening of cement to inhibit the hardening of cement in the raw material mixture, and it cannot be guaranteed that no wood containing a big amount of sugar is contained in said wood scrap which is used as a material of the reinforcing wood material. So it is difficult to make wood cement board of high quality on a stable basis.

SUMMARY OF THE INVENTION

To solve the above described problem, the present invention provides a wood cement board consisting of a reinforcing wood material and a cement wherein said reinforcing wood material is treated by a method to prevent the inhibition of the hardening of cement comprising attaching said reinforcing wood material with a mineral acid and then mixing an alkaline metal silicate and said reinforcing material may be regenerated from the wood scrap.

As a desirable method to manufacture said wood cement board, the present invention also provides a method comprising attaching a reinforcing wood material with a mineral acid then mixing an alkaline metal silicate to prevent the inhibition of the hardening of cement, mixing said treated reinforcing wood material and a cement, adjusting the water content of said mixture of said reinforcing wood material and said cement from 35 to 45% by weight by adding water in said mixture, scattering said mixture in a mold panel to form a mat, and pressing and incubaing said mat with said mold panel.

DETAILED DESCRIPTION OF THE INVENTION

[Cement]

A cement used in the present invention may be, for example, Portland cement; blast furnace cement in which Portland cement and blast furnace slag are mixed; fly ash cement in which fly ash is mixed; silica cement in which silica-containing materials such as volcanic ash, silica fume, silica sand and the like are mixed; and the like. Two or more kinds of cement may be used in the present invention.

[Reinforcing wood material]

A reinforcing wood material used in the present invention may be, for example, wood powder, wood wool, wood flake, wood pulp, wood fiber, bundled wood fiber and the like. Materials containing mainly ligno cellulose such as bamboo fiber, hemp fiber, baggasse, wheat straw chaff, rice straw and the like may be mixed with said reinforcing wood material. One of the preferable reinforcing wood materials is a wood flake with the width in the range between 0.5–2.0 mm, the length in the range between 1–20 mm, and an aspect ratio in the range between 20–30. Bundled wood fiber being branched and/or curved and/or bent with the diameter in the range between 0.1–2.0 mm, the length in the range between 2–35 mm is another preferable reinforcing wood material.

In the present invention, a reinforcing wood material regenerated from wood scrap can be used. Said wood scrap may be used lumbers produced in dismembering wood buildings, saw-dusts and chips produced in sawing process, thinned needle-leaved trees, scrap and chips of wood cement board and the like. Further, in the present invention, besides said reinforcing wood material, bamboo fiber, bamboo chips, hemp fiber, palm fiber, strained lees of sugar cane are also used as a reinforcing wood material. Two or more kinds of the reinforcing wood material may be used in the present invention.

[Treatment to prevent the inhibition of the hardening of cement]

First said reinforcing wood material is attached with an aqueous solution of a mineral acid. Said mineral acid is, for example, hydrochloric acid, sulfuric acid, phosphoric acid, nitric acid and the like. Said mineral acid is generally contained in said aqueous solution in the amount of 1 to 5% by weight. To attach said reinforcing wood material with said aqueous solution of said mineral acid, said reinforcing wood material is immersed into said aqueous solution or said aqueous solution is sprayed to said reinforcing wood material. Attaching amount of said aqueous solution of said mineral acid to said reinforcing wood material is preferably adjusted so as to show pH on the surface of said reinforcing wood material in the range between 2 to 5.

After the treatment of attaching of mineral acid, alkaline metal silicate is added and mixed with said reinforcing wood material. Said alkaline metal silicate is, for example, lithium silicate, potassium silicate, sodium silicate and the like. Two or more kinds of said alkaline metal silicate may be used in the present invention. Potassium silicate and sodium silicate are preferable alkaline metal silicate, because they are cheap and easy to get. And further, desirable mole ratio of silicate and alkali metal in said alkaline metal silicate is $SiO_2/Na_2O=2\sim4$ or $SiO_2/K_2O=3\sim4$.

Said alkaline metal silicate is added to said reinforcing wood material in the amount of 2–10% by weight.

[Aggregate]

Besides said cement and said reinforcing wood material, an aggregate, especially light aggregate may be added in the present invention. Said light aggregate is, for example, foamed inorganic material such as pearlite, silas baloon, expansive shale, expansive clay, burned diatomaceous earth, fly ash, coal cinders, crushed scrap of foamed concrete and the like.

Said light aggregate is usually added to the solid content of the raw material mixture in the amount of less than 30% by weight.

[Other component]

Besides the above described component, hardening promoter such as calcium sulfate, aluminate and the like; water-proof agents or water-repellent agents such as wax, paraffin, surface active agents, silicone and the like; may be added in the present invention.

[Manufacturing of wood cement board]

To manufacture the wood cement board of the present invention, a semi-dry method described below is advantageously applied. In said semi-dry method, a fixed amount of said component are mixed together to prepare a raw material mixture. Commonly, said mixture includes 40 to 70% by weight of cement, and 20 to 35% by weight of said reinforcing wood material which is treated by the above described method to prevent the inhibition of the hardening of cement. In said mixture, the water is further added to adjust the water content of said mixture 35 to 45% by weight.

A mat is formed by scattering said resulting mixture on a mold panel and the resulting mats are placed one upon another with mold panels and set in a press machine to press at a presser commonly in the range between 2 to 5 MPa. Said mats are heated commonly at a temperature of 60 to 100° C. for 10 to 20 hours keeping said mats pressed to cure. After said mats harden, said mats are removed from mold panels respectively and incubated commonly at a room temperature for 5 to 10 hours to manufacture wood cement boards.

Said wood cement board may also have two-layer structure or three-layer structure instead of one-layer structure. In the case of the wood cement board having two-layer structure, first the mixture containing the fine reinforcing wood material is scattered on the mold panel and then the mixture containing the coarse reinforcing wood material is scattered on the mold panel to form a mat having two-layer structure. The resulting mat is then pressed by heating to form a surface layer made from the mixture containing said fine reinforcing wood material and a back layer made from the mixture containing said coarse reinforcing wood material. In the case of the wood cement board having three-layer structure, the mixture containing the fine reinforcing wood material is further scattered on the said mat having two-layer structure and the resulting mat is then pressed by heating to form a core layer made from the mixture containing the coarse reinforcing wood material and a surface layer made from the mixture containing the fine reinforcing wood material on said core layer. To form said three-layer structure, a pair of mats having two-layer structure may be also laminated respectively. In this case, a pair of mats are laminated in such a way the layers consisting of the mixture containing said coarse reinforcing wood material attach each other.

In the present invention, said wood cement board may be also manufactured by the wet method. In the wet method, said raw material mixture is dispersed in the water to prepare a slurry having commonly a solid content in the range between 7 to 15% by weight and a wet mat is then formed by the paper-making method using said slurry and the resulting wet mat is pressed by heating with the mold panel.

In the present invention, sugar in said reinforcing wood material is hydrolyzed by the mineral acid when said reinforcing wood material is attached with the mineral acid. Further a film of silicate gel ($SiO_2$) is formed on the surface of said reinforcing wood material by a reaction between said mineral acid and alkaline metal silicate when alkaline metal silicate is added and mixed in said reinforcing wood material treated with mineral acid as described bellow.

Hydrochloric acid and tertiary sodium silicate $$Na_2O \cdot 3SiO_2 + 2HCl = 2NaCl + 3SiO_2 + H_2O$$

Sulfuric acid and tertiary sodium silicate $$Na_2O \cdot 3SiO_2 + H_2SO_4 = Na_2SO_4 + 3SiO_2 + H_2O$$

Phosphoric acid and tertiary sodium silicate $$3(Na_2O \cdot 3SiO_2) + 2H_3PO_4 = 2Na_3PO_4 + 9SiO_2 + 3H_2O$$

Said film of silicate gel formed as above described prevents sugar from dissolving out in said reinforcing wood material into said raw material mixture and further said film of silicate gel reacts with calcium ion produced by hydration of cement to produce a film of calcium silicate gel. Said film of calcium silicate gel hardens during incubation of the mat and acts as an adhesive between said reinforcing wood material and cement matrix.

[EXAMPLE 1 TO 7 AND COMPARISON 1 TO 3]

Components shown in Table 1 are mixed together to prepare the raw material mixture. Kinds of reinforcing wood materials are also shown in Table 1 and said reinforcing wood materials are respectively treated by mineral acid and alkaline metal silicate shown in Table 1 to prevent the inhibition of the hardening of cement.

Said raw material mixtures are respectively scattered on mold panels and pressed with said mold panels respectively and incubated by heating to harden.

Properties of the resulting wood cement boards are respectively shown in Table 1.

Referring to Table 1, although the wood flake made from wood containing a big amount of sugar is used in the present invention (Example 1 to 7), the hardening of cement can be smoothly proceeded and a wood cement board having a high strength, a good dimensional stability (water absorption test) and a good freezing-thaw resistance while in the case of Comparison 1 in which untreated wood flake is used, cement cannot be hardened and wood cement board cannot be obtained. In Comparison 2, magnesium chloride is used as a hardening promoter but the resulting wood cement board has less strength, poor dimensional stability and poor freezing-thaw resistance than the cement board of the present invention, and further wood cement board of Comparison 2 corrodes nail, metal joiner and the like while wood cement board of the present invention less corrodes nail, metal joiner and the like since said wood cement board contains no metal salt which corrodes metal. Wood cement board of Comparison 3 in which only sodium silicate is added also has less strength, poor dimensional stability and poor freezing-thaw resistance than the wood cement board of the present invention.

Accordingly in the present invention, a wood cement board having a high strength is constantly manufactured by using reinforcing wood material made from wood having a big amount of sugar as an inhibiter of hardening of cement such that reinforcing wood material regenerated from wood scrap can be used in wood cement board without any problem.

TABLE 1

| | | Example 1 Sample 1 | Example 2 Sample 2 | Example 3 Sample 3 | Example 4 Sample 4 | Example 5 Sample 5 | Example 6 Sample 6 | Example 7 Sample 7 | Comparison 1 Sample 8 | Comparison 2 Sample 9 | Comparison 3 Sample 10 |
|---|---|---|---|---|---|---|---|---|---|---|---|
| Raw material % | Portland cement | 69.6 | 69.6 | 69.6 | 69.6 | 69.6 | 69.6 | 69.6 | 69.6 | 69.6 | 69.6 |
| Wood flake | Larch lumber | 29.0 | — | — | — | 29.0 | 29.0 | — | 29.0 | 29.0 | 29.0 |
| | Thinned ceder, core lumber | — | 29.0 | 29.0 | — | — | — | 29.0 | — | — | — |
| | Used lumber produced in dis-membering wood building | — | — | — | — | — | — | — | — | — | — |
| | Scrap of cement board and saw-dust from lumbering | — | — | — | 29.0 | — | — | — | — | — | 14 |
| Treatment of wood flake % | Attaching amount of mineral acid | | | | | | | | | | |
| | Hydrochloric acid | 0.28 | 0.28 | 0.28 | 0.28 | — | — | — | — | — | — |
| | Sulfuric acid | — | — | — | — | 0.28 | — | — | — | — | — |
| | Nitric acid | — | — | — | — | — | 0.28 | 0.28 | — | — | — |
| | Attaching amount of alkaline metal silicate | | | | | | | | | | |
| | Sodium silicate | 1.4 | 1.4 | 1.4 | 1.4 | 1.4 | — | — | — | — | 1.4 |
| | Potassium silicate | — | — | — | — | — | 1.4 | 1.4 | — | — | — |
| | Hardening agent magnesium chloride | — | — | — | — | — | — | — | — | 1.4 | — |
| Press and incubation | Pressing condition MPa | 3.6 | 3.6 | 3.6 | 3.6 | 3.6 | 3.6 | 3.6 | 3.6 | 3.6 | 3.6 |
| | Hardening condition °C. + Hrs | 80 + 15 | 80 + 15 | 80 + 15 | 80 + 15 | 80 + 15 | 80 + 15 | 80 + 15 | 80 + 15 | 80 + 15 | 80 + 15 |
| | Incubating condition °C. + day | 25 + 7 | 25 + 7 | 25 + 7 | 25 + 7 | 25 + 7 | 25 + 7 | 25 + 7 | 25 + 7 | 25 + 7 | 25 + 7 |
| Properties | Specific gravity | 1.09 | 1.08 | 1.10 | 1.10 | 1.06 | 1.08 | 1.07 | Wood cement board cannot be obtained | 1.05 | 0.97 |
| | Bending strength after primary hardening MPa | 6.0 | 6.4 | 6.8 | 7.2 | 5.8 | 6.3 | 5.1 | | 5.7 | 4.0 |
| | Sending strength after incubation MPa*¹ | 11.4 | 12.2 | 12.9 | 13.1 | 10.8 | 11.0 | 9.8 | | 9.7 | 6.9 |
| | Young's modulus × 10³N/mm | 3.5 | 3.5 | 3.6 | 3.4 | 3.2 | 3.4 | 3.0 | | 2.6 | 1.7 |
| | Vertical tensile strength MPa | 1.00 | 1.02 | 1.10 | 1.11 | 0.97 | 1.01 | 0.95 | | 0.93 | 0.6 |
| | Water absorption test %*² | 0.31 | 0.32 | 0.32 | 0.33 | 0.32 | 0.31 | 0.34 | | 0.46 | 0.36 |
| | Freezing-thaw test thickness swelling ratio %*³ | 2.6 | 2.7 | 2.5 | 2.5 | 2.4 | 2.8 | 3.0 | | 3.2 | 8.3 |
| General estimation | | ○ | ○ | ○ | ○ | ○ | ○ | ○ | | △ | X |

*¹Sending strength (JIS A-1409)
*²Water absorption test (JIS A-5422): Each sample was immersed in water for 15 days at room temperature. The elongation ratio of each sample after immersion in water was determined.
*³Freezing-thaw test (JIS A-1435 30 cycle)

We claim:

1. A manufacturing method of a wood cement board comprising the steps of:

preparing a raw material mixture containing principally a reinforcing wood material and a cement wherein said raw material mixture has a water content in the range between 35 to 45% by weight by adding water, scattering said mixture on a mold panel to form a mat, and pressing and incubating said mat with said mold panel to harden said mat wherein said reinforcing wood material is treated by a method consisting of: treating said reinforcing wood material with an aqueous solution of a mineral acid selected from a group consisting of hydrochloric acid, sulfuric acid, phosphoric acid, and nitric acid and then treating said reinforcing wood material with an alkaline metal silicate to form a silicate gel film on the surface of said reinforcing wood material prior to the preparation of said raw material mixture.

2. A manufacturing method of a wood cement board in accordance with claim 1 wherein said reinforcing wood material is regenerated from wood scrap.

* * * * *